(12) United States Patent
Currivan et al.

(10) Patent No.: US 9,379,825 B2
(45) Date of Patent: Jun. 28, 2016

(54) TRIGGER SYNCHRONIZED EVENT FOR CHANNEL CHARACTERIZATION WITHIN COMMUNICATION SYSTEMS

(71) Applicant: BROADCOM CORPORATION, Irvine, CA (US)

(72) Inventors: Bruce Joseph Currivan, Los Altos, CA (US); Roger Wayne Fish, Superior, CO (US); Lisa Voigt Denney, Suwanee, GA (US); Niki Roberta Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 67 days.

(21) Appl. No.: 14/502,096

(22) Filed: Sep. 30, 2014

(65) Prior Publication Data

US 2015/0092587 A1    Apr. 2, 2015

Related U.S. Application Data

(60) Provisional application No. 61/884,445, filed on Sep. 30, 2013.

(51) Int. Cl.
| | |
|---|---|
| *H04L 12/801* | (2013.01) |
| *H04L 12/26* | (2006.01) |
| *H04B 17/00* | (2015.01) |
| *H04B 3/46* | (2015.01) |
| *H04L 27/26* | (2006.01) |
| *H04L 25/02* | (2006.01) |
| *H04L 5/00* | (2006.01) |

(52) U.S. Cl.
CPC ............... *H04B 17/009* (2013.01); *H04B 3/46* (2013.01); *H04L 5/008* (2013.01); *H04L 5/0091* (2013.01); *H04L 25/0238* (2013.01); *H04L 27/2605* (2013.01); *H04L 27/2626* (2013.01); *H04L 27/2647* (2013.01); *H04L 5/0007* (2013.01); *H04L 27/2655* (2013.01)

(58) Field of Classification Search
CPC .............................. H04L 47/10; H04L 43/50
USPC .......................................................... 370/252
See application file for complete search history.

(56) References Cited

U.S. PATENT DOCUMENTS

2006/0050625 A1*   3/2006   Krasner .................... G01S 1/04
                                                              370/208

* cited by examiner

*Primary Examiner* — Ronald B Abelson
(74) *Attorney, Agent, or Firm* — Garlick & Markison; Shayne X. Short

(57) ABSTRACT

A new protocol uses a trigger message to identify one or more symbols transmitted between a first and a second communication device. The first device generates and transmits a trigger message to the second device. This process may be initiated based on the first device receiving a measurement initiation message from another device (e.g., such as the second device or another device within the system). Then, the first device transmits a signal that includes those one or more symbols to the second device. Before or during transmission, the first device generates a first capture of those one or more symbols. After receipt of the transmission from the first device, the second device performs a second capture of those one or more symbols identified within the trigger message. Then, any device having the first and second captures can determine a characterization of the communication pathway between the first and second devices.

20 Claims, 10 Drawing Sheets

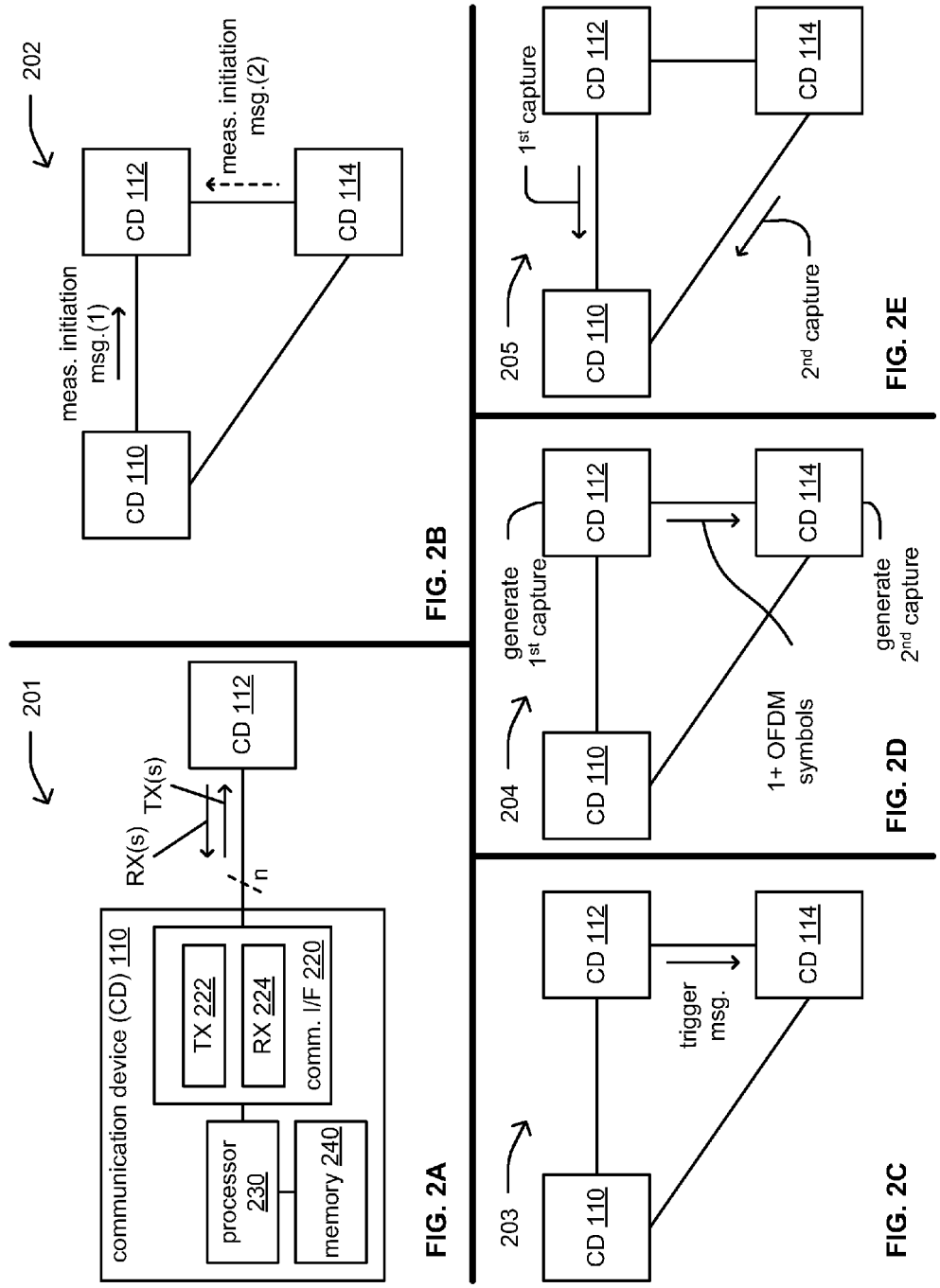

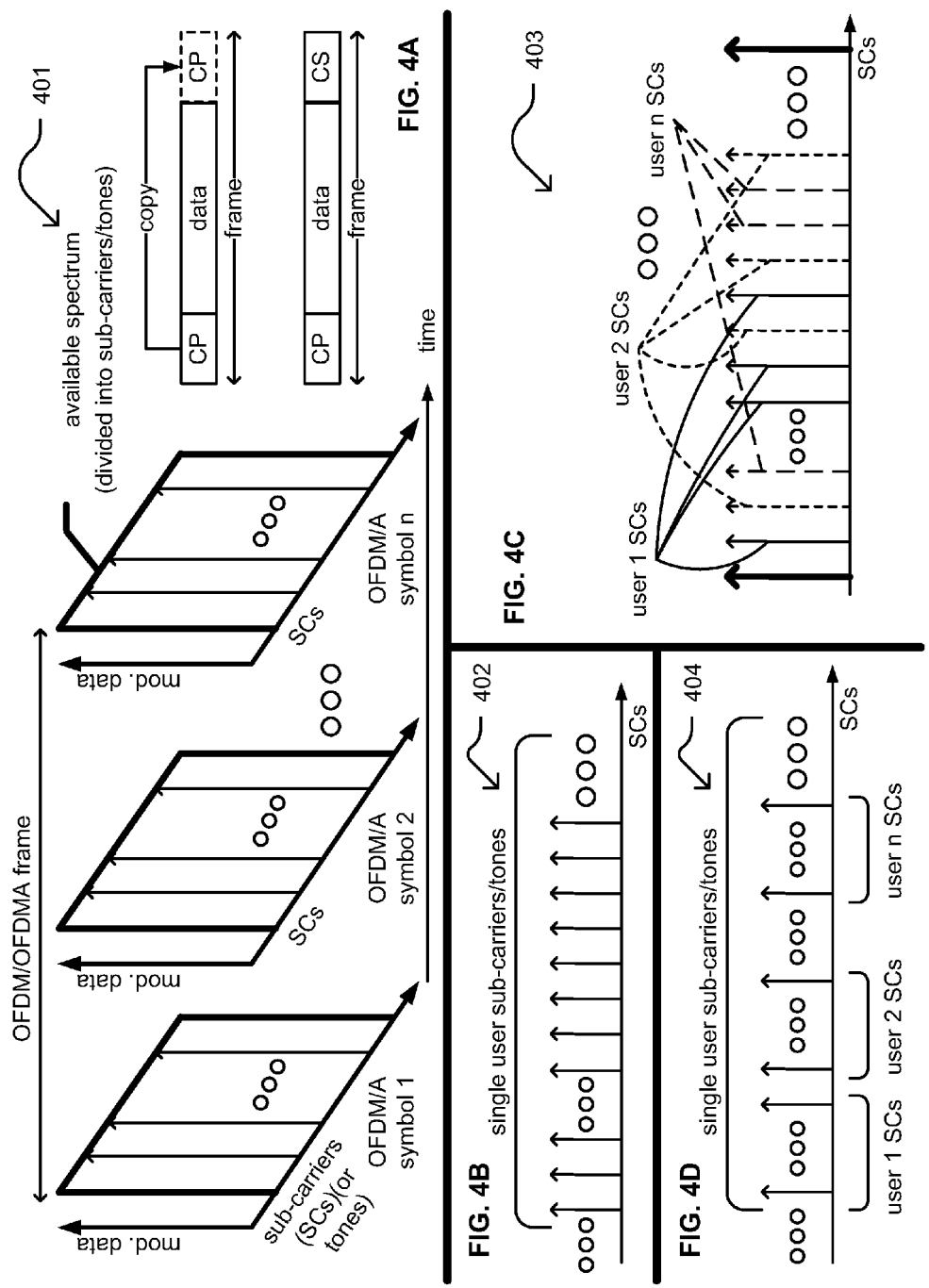

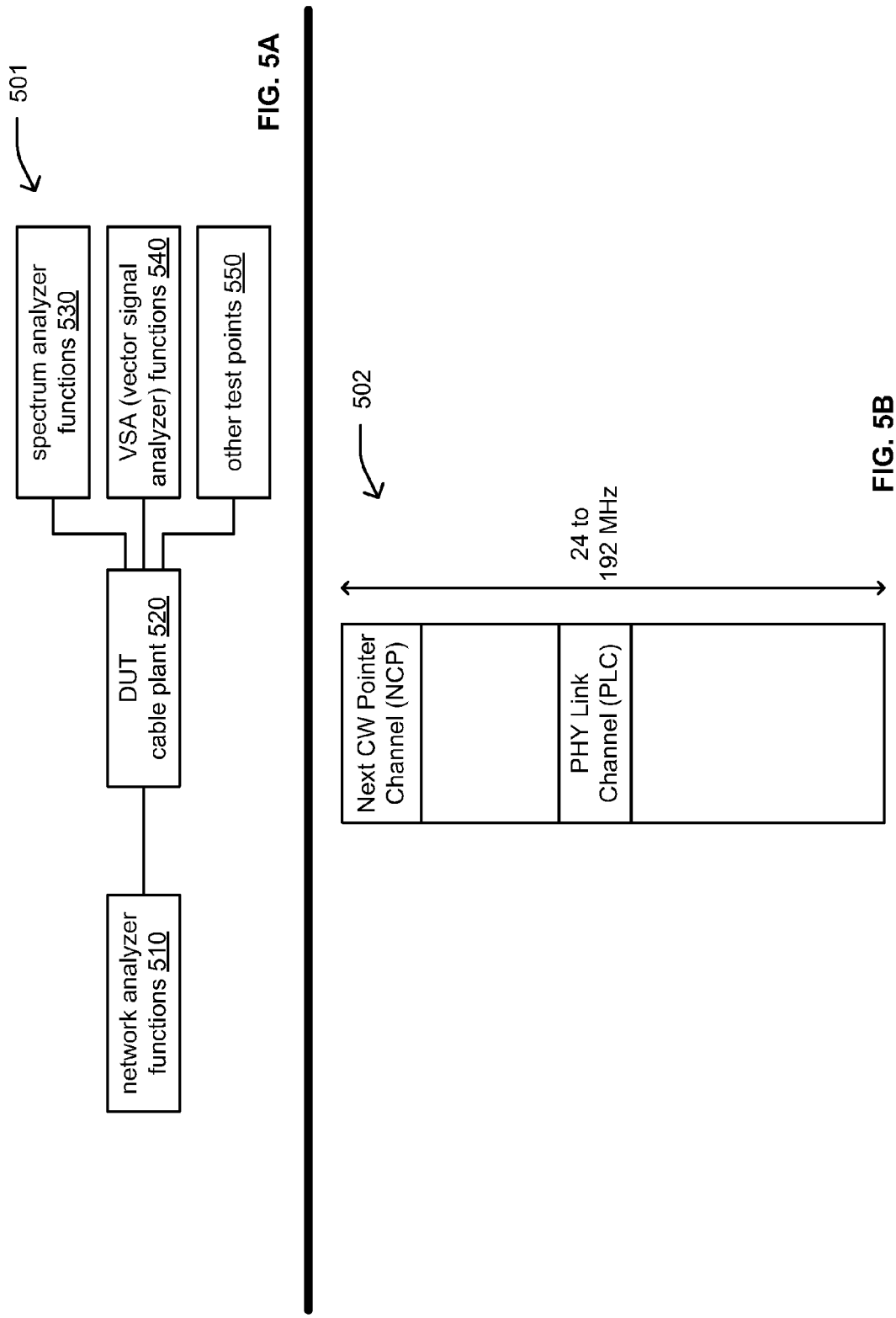

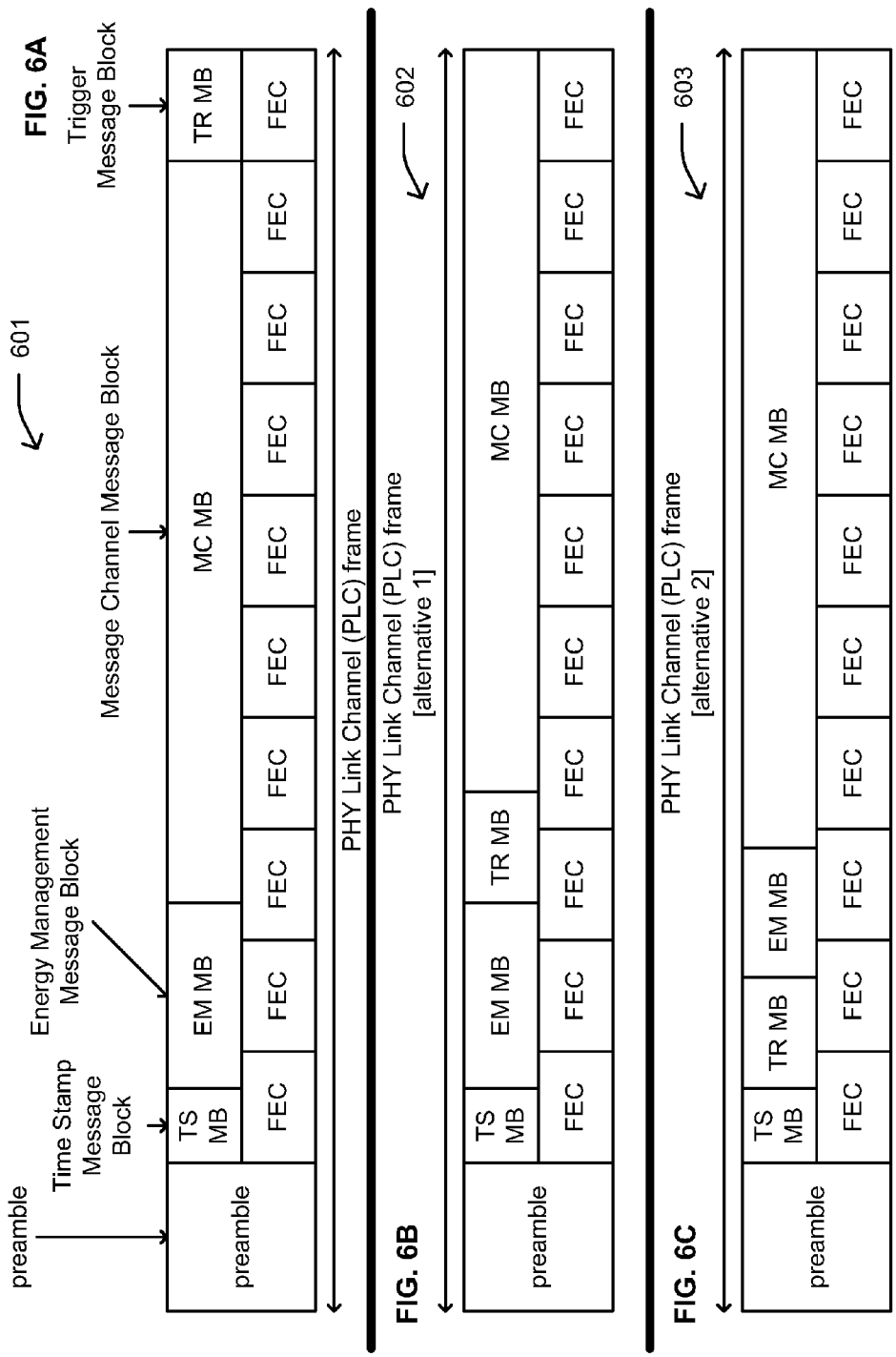

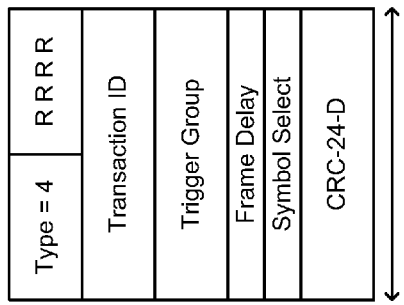
| FFT Size | Symbol Time | PLC Frame | | | Data Capacity | | Frame Time (ms) based upon Cyclic Prefix (us) | | | | |
|---|---|---|---|---|---|---|---|---|---|---|---|
| | | Sub carriers | FEC Blocks | Raw Bytes | Payload Bytes | Min | Max | 0.9375 µs | 1.25 µs | 2.5 µs | 3.75 µs | 5.0 µs |
| 4K | 20 µs | 8 | 10 | 480 | 360 | 0.9 | 1.1 | 2.68 | 2.72 | 2.88 | 3.04 | 3.20 |
| 8K | 40 µs | 16 | 20 | 960 | 720 | 1.0 | 1.1 | 5.24 | 5.28 | 5.44 | 5.60 | 5.76 |
FIG. 7A
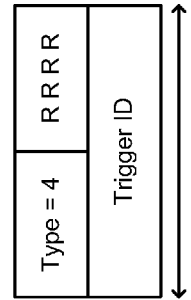
| Type = 4 | R R R R |
|---|---|
| Trigger ID | |
← 1 byte →
FIG. 7B
| Type = 4 | R R R R |
|---|---|
| Transaction ID | |
| Trigger Group | |
| Frame Delay | |
| Symbol Select | |
| CRC-24-D | |
← 1 byte →
FIG. 7C

← 801

| Field | Size | Value | Description |
|---|---|---|---|
| Type | 4 bits | 4 | Trigger MB |
| R | 4 bits | | Reserved |
| Trigger ID | 2 bytes | | Trigger Identifier |

| Field | Size | Value | Description |
|---|---|---|---|
| Message Block Type | 4 bits | 4 | Trigger MB |
| Trigger Type | 4 bits | 1 | Identifies type of action to perform |
| Transaction ID | 1 byte | | Increments on each TR MB sent |
| Trigger Group | 2 bytes | | Group for unicast, multicast and broadcast triggers |
| Frame Delay | 1 byte | 2 to 31 | How many frames to wait before performing action |
| Symbol Select | 1 byte | 0 to 127 | Which symbol in PLC frame to perform action upon |
| CRC | 3 bytes | | CRC-24-D<br>CRC field is computed over the entire message block except the CRC field itself, and included in the defined format to allow validation of the integrity message block type and message body size |

FIG. 8B

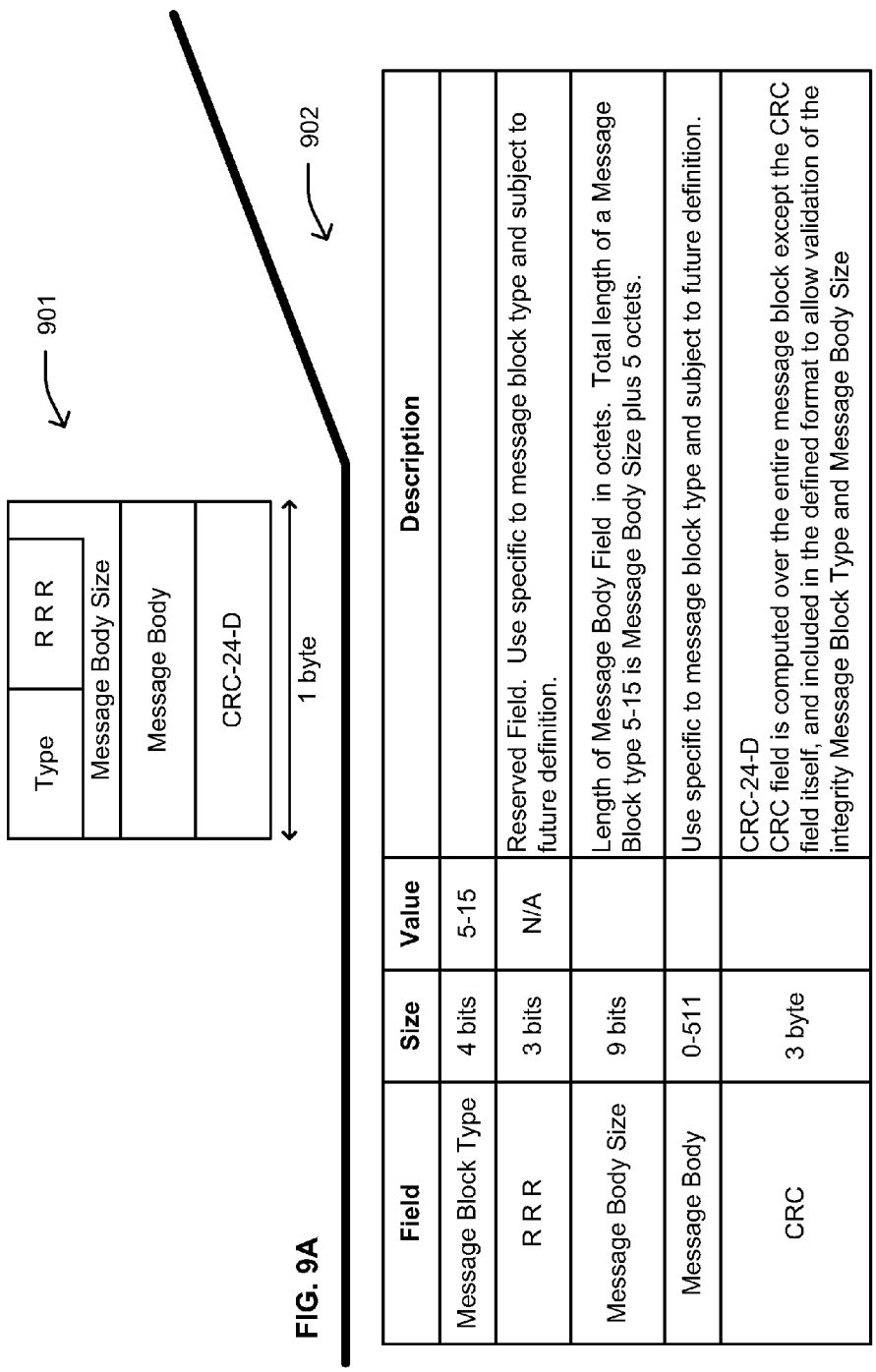

| Field | Size | Value | Description |
|---|---|---|---|
| Message Block Type | 4 bits | 5-15 | |
| R R R | 3 bits | N/A | Reserved Field. Use specific to message block type and subject to future definition. |
| Message Body Size | 9 bits | | Length of Message Body Field in octets. Total length of a Message Block type 5-15 is Message Body Size plus 5 octets. |
| Message Body | 0-511 | | Use specific to message block type and subject to future definition. |
| CRC | 3 byte | | CRC-24-D<br>CRC field is computed over the entire message block except the CRC field itself, and included in the defined format to allow validation of the integrity Message Block Type and Message Body Size |

TRIGGER SYNCHRONIZED EVENT FOR CHANNEL CHARACTERIZATION WITHIN COMMUNICATION SYSTEMS

CROSS REFERENCE TO RELATED PATENTS/PATENT APPLICATIONS

Provisional Priority Claim

The present U.S. Utility patent application claims priority pursuant to 35 U.S.C. §119(e) to U.S. Provisional Application No. 61/884,445, entitled "Mechanism to trigger synchronized event at cable headend or cable modem termination system (CMTS) and remote device such as cable modem (CM)," filed 09-30-2013, which is hereby incorporated herein by reference in its entirety and made part of the present U.S. Utility patent application for all purposes.

BACKGROUND

1. Technical Field

The present disclosure relates generally to communication systems; and, more particularly, to channel characterization of communication pathways within such communication systems.

2. Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of adverse effects include interference and noise that may be caused by various sources including other communications, low-quality links, degraded or corrupted interfaces and connectors, etc.

Some communication systems use forward error correction (FEC) coding and/or error correction code (ECC) coding to increase the reliability and the amount of information that may be transmitted between devices. When a signal incurs one or more errors during transmission, a receiver device can employ the FEC or ECC coding to try to correct those one or more errors.

A continual and primary directive in this area of development has been to try continually to lower the signal to noise ratio (SNR) required to achieve a given bit error ratio (BER) or symbol error ratio (SER) within a communication system. The Shannon limit is the theoretical bound for channel capacity for a given modulation and code rate. The ideal goal has been to try to reach Shannon's channel capacity limit in a communication channel. Shannon's limit may be viewed as being the data rate per unit of bandwidth (i.e., spectral efficiency) to be used in a communication channel, having a particular SNR, where transmission through the communication channel with arbitrarily low BER or SER is achievable.

Within such communication systems, it can be desirable to characterize a communication pathway between a first device and the second device. Examples of characterization of a communication pathway may be related to noise, interference, signal to noise ratio (SNR), signal to interference noise ratio (SINR), etc. among other types of characterization. Prior art systems do not provide an adequate means by which a synchronized event can be coordinated between a first and second device for use in characterizing the communication pathway between the devices. There continues to be a need for improved means by which communication pathways may be characterized within communication systems.

BRIEF DESCRIPTION OF THE SEVERAL VIEWS OF THE DRAWINGS

FIG. 2A is a diagram illustrating a communication device (CD) operative within one or more communication systems.

FIG. 2B is a diagram illustrating an example of communications between CDs within one or more communication systems.

FIG. 2C is a diagram illustrating another example of communications between CDs within one or more communication systems.

FIG. 2D is a diagram illustrating another example of communications between CDs within one or more communication systems.

FIG. 2E is a diagram illustrating another example of communications between CDs within one or more communication systems.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 5A is a diagram illustrating an example of test points in various locations within one or more communication systems.

FIG. 5B is a diagram illustrating an example of an OFDM channel with physical layer (PHY) Link Channel (PLC) prior to interleaving.

FIG. 6A is a diagram illustrating an example of PLC frame structure.

FIG. 6B is a diagram illustrating another example of PLC frame structure.

FIG. 6C is a diagram illustrating another example of PLC frame structure.

FIG. 7A is a diagram illustrating an example of a table describing PLC frame length including preamble.

FIG. 7B is a diagram illustrating an example of a trigger message (alternatively, trigger message block, or TR MB).

FIG. 7C is a diagram illustrating another example of a trigger message (alternatively, trigger message block, or TR MB).

FIG. 8A is a diagram illustrating an example of a table describing message block (MB) field description.

FIG. 8B is a diagram illustrating an example of a table describing message block (MB) field description.

FIG. 9A is a diagram illustrating an example of a generic format for message blocks.

FIG. 9B is a diagram illustrating an example of a table describing fields of the generic format for message blocks.

DETAILED DESCRIPTION

Figure 1A:
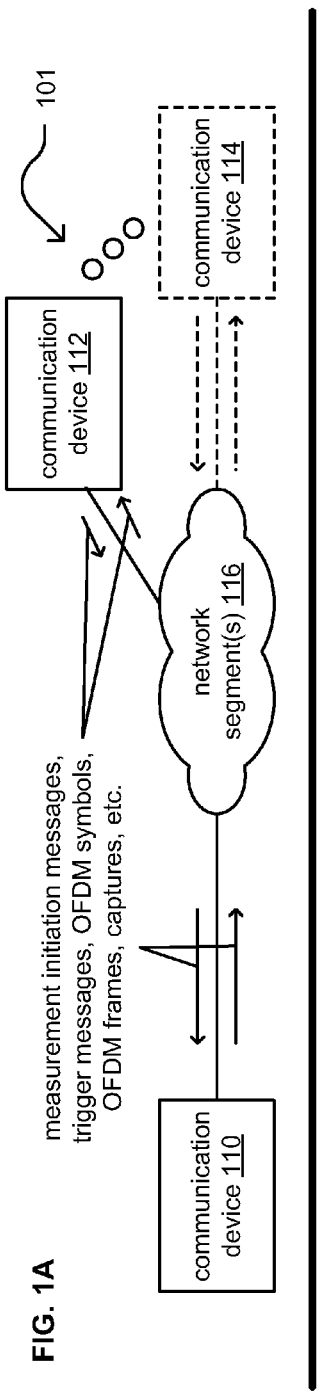
FIG. 1A is a diagram illustrating an embodiment of one or more communication systems.

FIG. 1A is a diagram illustrating an embodiment 101 of one or more communication systems. One or more network segments 116 provide communication inter-connectivity for at least two communication devices 110 and 112 (also referred to as CDs in certain locations in the diagrams). Note that general reference to a communication device may be made generally herein using the term 'device' (e.g., device 110 or CD 110 when referring to communication device 110, or devices 110 and 112, or CDs 110 and 112, when referring to communication devices 110 and 112). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 112-114. This communication may be bidirectional/to and from the one or more of the other devices 112-114 or unidirectional (or primarily unidirectional) from the one or more of the other devices 112-114.

In one example, device 110 includes a processor that generates, modulates, encodes, etc. and transmits signals via a communication interface of the device 110 and also receives and processes, demodulates, decodes, etc. other signals received via the communication interface of the device 110 (e.g., received from other devices such as device 112, device 114, etc.).

In an example of operation, device 110 receives a measurement initiation message from another one of the devices in the system, such as device 112. In some instances, device 110 operates without necessarily receiving a measurement initiation message from another one of the devices but determines to perform a measurement process independently. Then, device 110 generates a trigger message (e.g., after the measurement initiation message is received from another device or determines independently to generate the trigger message). The trigger message specifies a location of at least one orthogonal frequency division multiplexing (OFDM) data symbol to be transmitted from the device 110 to another device (e.g., device 112 or device 114) via a communication pathway between device 110 and that other device. The device 110 then transmits, via a communication interface of the device 110, the trigger message to the other device. The trigger message may specify one or more other devices that will subsequently receive the at least one OFDM data symbol. In such instances, the device 110 then transmits the trigger message to the one or more other devices identified within the trigger message. Also, the device 110 generates a first capture that includes a first plurality of OFDM symbol samples of the at least one OFDM data symbol. This capture may then be stored within memory of the device 110 and may subsequently be transmitted to another device within the system. In one example, the device 110 transmits the first capture to the one or more other devices to which the at least one OFDM data symbol will subsequently be transmitted. In another example, the device 110 transmits the first capture to the other device that transmitted the measurement initiation message to the device 110. In even another example, the device 110 maintains and stores the first capture for subsequent use within device 110.

The device 110 then transmits, via its communication interface, the at least one OFDM data symbol to the one or more other communication devices identified within the trigger message via one or more communication pathways that interconnect, connect, or couple, etc. the device 110 and those other devices.

Then, a device that receives the at least one OFDM data symbol within the trigger message (e.g., device 112) performs a second capture that includes a second plurality of OFDM symbol samples of the at least one OFDM symbol. This second capture may be different from the first capture performed by device 110 when channel effects are incurred by the at least one OFDM data symbol during transmission via the communication pathway. A device within the system can characterize the communication pathway between device 110 and the device that receives the at least one OFDM data symbol identified within the trigger message (e.g., device 112). In one example, device 110 receives the second capture from device 112 after device 112 has performed the second capture. The device 110 then determines a characterization of the communication pathway between device 110 and 112 based on the first and second capture. In another example, device 112 receives the first capture from device 110, and device 112 then determines a characterization of the communication pathway between device 110 and 112 based on the first and second capture (e.g., the second capture being stored and available within device 112). In even another example, another device, such as device 114, receives the first and second captures from device 110 and 112, respectively, and device 114 then determines a characterization of the communication pathway between device 110 and 112 based on the first and second capture.

Note that the devices 110 and 112 may perform the first and second captures in any of different ways (e.g., in the frequency and/or time domains). In an example, device 110 performs the first capture in the frequency domain (e.g., before an inverse fast Fourier transform (IFFT) process), and the device 112 performs the second capture in the time domain (e.g., before a fast Fourier transform (FFT) process). In another example, device 110 performs the first capture in the time domain, and the device 112 performs the second capture in the frequency domain. In yet another example, both devices perform their respective captures in the frequency domain. In even another example, both devices perform their respective captures in the time domain.

Also, note that the at least one OFDM data symbol to be transmitted from the device 110 to another device and as specified in the trigger message can be an ordinary data symbol. From certain perspectives, by using an ordinary data symbol in this manner, and capturing it at input (e.g., before transmission) and output of the communication pathway in the communication system (e.g., after receipt) may be viewed as treating the data symbol as if it were a probe symbol. A probe symbol has known content and thereby allows determining an accurate characterization of the channel response of the communication pathway once the output of the transmission via the communication pathway is observed. In this disclosure, since the data symbol is captured at the channel input, it functions similarly as a probe. Since the input and output of the channel are both known (e.g., based on the at least one OFDM data symbol identified in the trigger message), the channel response of the communication pathway can be determined.

Note that there may be instances in which certain devices within the system or not operative or enabled to perform such operations. Such a device may be described as not being trigger-enabled. A device that is operative and enabled to perform such operations may be described as trigger-enabled. A device may change status from being trigger-enabled at or during a first period of time and not trigger-enabled at or during a second time. Considering trigger-enablement, when a device receives the trigger message and is not trigger-enabled, then the device ignores the subsequent operations related to the channel characterization process. Alternatively, when the device receives the trigger message and is trigger-enabled, the device will subsequently coordinate with and perform at least some of the operations related to characterization of a communication pathway within the system.

Figure 1B:
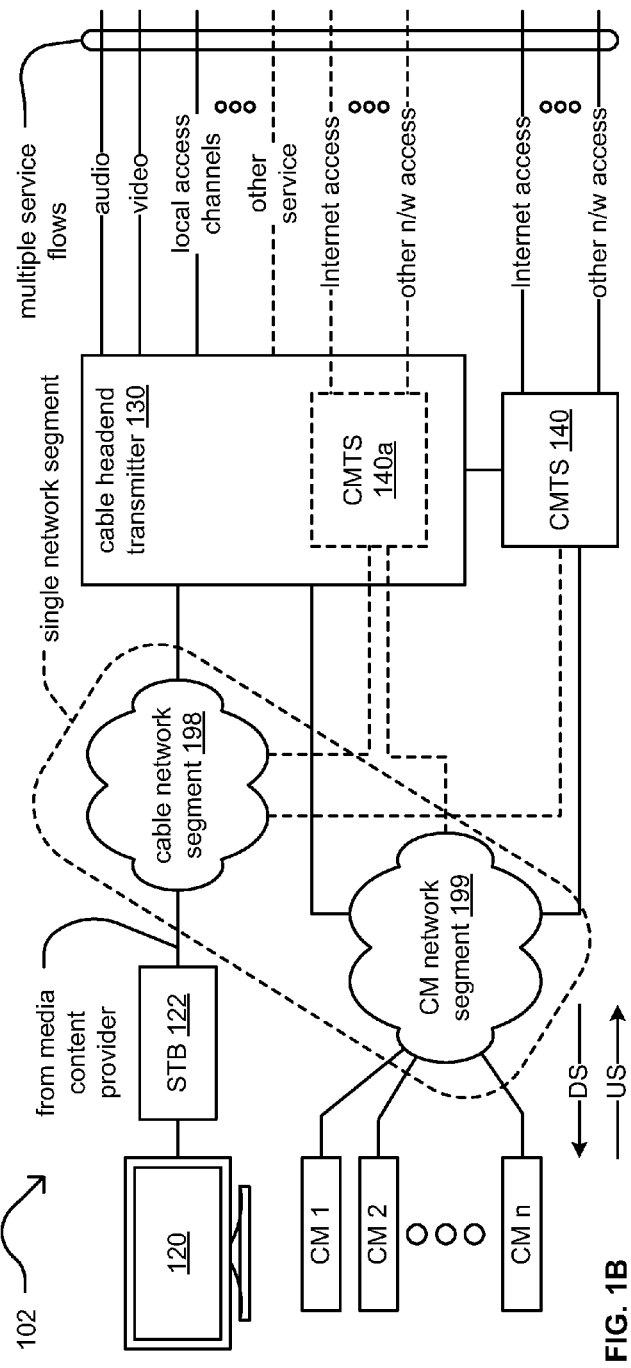
FIG. 1B is a diagram illustrating another embodiment of one or more communication systems.

FIG. 1B is a diagram illustrating another embodiment 102 of one or more communication systems. A cable headend transmitter 130 provides service to a set-top box (STB) 122 via cable network segment 198. The STB 122 provides output to a display capable device 120. The cable headend transmitter 130 can support any of a number of service flows such as audio, video, local access channels, as well as any other service of cable systems. For example, the cable headend transmitter 130 can provide media (e.g., video and/or audio) to the display capable device.

The cable headend transmitter 130 may provide operation of a cable modem termination system (CMTS) 140a. For example, the cable headend transmitter 130 may perform such CMTS functionality, or a CMTS may be implemented separately from the cable headend transmitter 130 (e.g., as shown by reference numeral 140). The CMTS 140 can provide network service (e.g., Internet, other network access, etc.) to any number of cable modems (shown as CM 1, CM 2, and up to CM n) via a cable modem (CM) network segment 199. The cable network segment 198 and the CM network segment 199 may be part of a common network or common networks. The cable modem network segment 199 couples the cable modems 1-n to the CMTS (shown as 140 or 140a). Such a cable system (e.g., cable network segment 198 and/or CM network segment 199) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 140 (or 140a) is a component that exchanges digital signals with cable modems 1-n on the cable modem network segment 199. Each of the cable modems is coupled to the cable modem network segment 199, and a number of elements may be included within the cable modem network segment 199. For example, routers, splitters, couplers, relays, and amplifiers may be contained within the cable modem network segment 199. Generally speaking, downstream information may be viewed as that which flows from the CMTS 140 to the connected cable modems (e.g., CM 1, CM2, etc.), and upstream information as that which flows from the cable modems to the CMTS 140.

In an example of operation, consider that CMTS 140 receives a measurement initiation message from another device in the system (e.g., a cable modem such as CM 1, the STB 122, or another remote device within the system not shown, etc.). The trigger message specifies a location of at least one orthogonal frequency division multiplexing (OFDM) data symbol to be transmitted from the CMTS 140 to an other communication device, e.g., CM 1, via a communication pathway. The CMTS 140 then operates by transmitting the trigger message to CM 1. The CMTS 140 generates a first capture that includes a first plurality of OFDM symbol samples of the at least one OFDM data symbol. The CMTS 140 then transmits the at least one OFDM data symbol to CM 1 via the communication pathway (e.g., transmits those one or more symbols identified within the trigger message that has been transmitted to CM 1). The CMTS 140 then transmits the first capture to the device from which the measurement initiation message was received (e.g., a cable modem such as CM 1, the STB 122, or another remote device within the system not shown, etc.). The device that has both the first and second captures is then able to determine a characterization of the communication pathway between the CMTS 140 and CM 1.

In another example of operation, consider the CMTS 140 independently generates the trigger message identifying another device within the system, e.g., CM 2, to which the trigger message and the one or more symbols identified within the trigger message are to be transmitted. CMTS 140 and transmits the trigger message to CM 2 and subsequently transmits the one or more symbols identified within the trigger message after having performed a first capture of those one or more symbols. The CM 2 generates a second capture of the one or more symbols identified with the trigger message upon receiving them. The CM 2 can perform a characterization of the communication pathway between CMTS 140 and CM 2 if it receives the first capture from the CMTS 140. In another example, CMTS 140 can determine a characterization of the communication pathway between CMTS 140 and CM 2 if it receives the first capture from the CM 2. In yet another example, another device within the system (e.g., CM 1, STB 122, or another remote device within the system not shown, etc.) that has both the first and second captures then is able to determine a characterization of the communication pathway between the CMTS 140 and CM 2.

Generally speaking, a new protocol that includes transmitting a trigger message from a first device to a second device thereby identifying one or more symbols (e.g., that may be included within one or more frames or may be one or more symbols transmitted without any formal framing structure) that are to be transmitted from the first device to the second device allows for the first device and the second device to perform respective captures, first and second, of one or more symbols transmitted via the communication pathway between the first and second device. Any devices in the system having access to both the first and second captures of the one or more symbols transmitted via that communication pathway between the first and second devices can determine a characterization of the communication pathway.

Note again that certain devices may be trigger-enabled and others may not be. In addition, some devices may be trigger-enabled at sometimes and not others. When a device is not trigger-enabled, that device will not participate within the characterization process described herein.

FIG. 2A is a diagram 201 illustrating a communication device (CD) 110 operative within one or more communication systems. The device 110 includes a communication interface 220 and a processor 230. The communication interface 220 includes functionality of a transmitter 222 and a receiver 224 to support communications with one or more other devices within a communication system. The device 110 may also include memory 240 to store information including one or more signals generated by the device 110 or such information received from other devices (e.g., device 112) via one or more communication channels. Memory 240 may also include and store various operational instructions for use by the processor 230 in regards to the processing of messages and/or other received signals and generation of other messages and/or other signals including those described herein. Memory 240 may also store information including one or more types of encoding, one or more types of symbol mapping, concatenation of various modulation coding schemes, etc. as may be generated by the device 110 or such information received from other devices via one or more communication channels. The communication interface 220 supports communications to and from one or more other devices (e.g., CD 112 and/or other communication devices). Operation of the communication interface 220 may be directed by the processor 230 such that processor 230 transmits and receives signals (TX(s) and RX(s)) via the communication interface 220. Generally speaking, device 110 is able to support communications with one or more other devices within one or more communication systems including device 112.

Note that device 110 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system.

The operations of the FIGS. 2B, 2C, 2D, and 2E may be viewed as being performed at different times during a channel characterization process.

FIG. 2B is a diagram 202 illustrating a communication device (CD) 110 operative within one or more communication systems. Device 110 supports communications to and from one or more other devices, such as device 112 and device 114. Generally, each of devices 110, 112, and 114 can all communicate with one another via one or more communication pathways, links, etc.

In an example of operation, device 112 receives a measurement initiation message from device 110. In another example of operation, device 112 receives a measurement initiation message from device 114. In even another example operation, device 112 does not receive any measurement initiation message from another device and determines to perform or initiate a channel characterization process with another one of the devices independently.

FIG. 2C is a diagram illustrating another example 203 of communications between CDs within one or more communication systems. In this diagram, device 112 transmits a trigger message to device 114. The device 112 may transmit the trigger message based on receipt of a measurement initiation message from another device as described with reference to FIG. 2B. Alternatively, the device 112 may transmit the trigger message independently without being based on receipt of a measurement initiation message.

FIG. 2D is a diagram illustrating another example 204 of communications between CDs within one or more communication systems. In this diagram, device 112 transmits one or more OFDM symbols to device 114. This transmission includes those one or more symbols that are identified within the trigger message that device 112 transmits to device 114. Device 112 also generates a first capture of those one or more symbols that are identified within the trigger message before transmission of those one or more OFDM symbols to device 114. Also, because the device 114 has received the trigger message prior, after the device 114 has received the transmission from device 112, the device 114 generates a second capture of those same one or more symbols that are identified within the trigger message.

FIG. 2E is a diagram illustrating another example 205 of communications between CDs within one or more communication systems. In this diagram, device 112 transmits the first capture generated to device 110, and device 114 transmits a second capture generated to device 110. Device 110 then operates to determine a characterization of the communication pathway between devices 112 and 114 based on the first and second captures. Generally speaking, any devices in the system that has both the first and second captures can determine a characterization of the communication pathway between devices 112 and 114.

Figure 3:
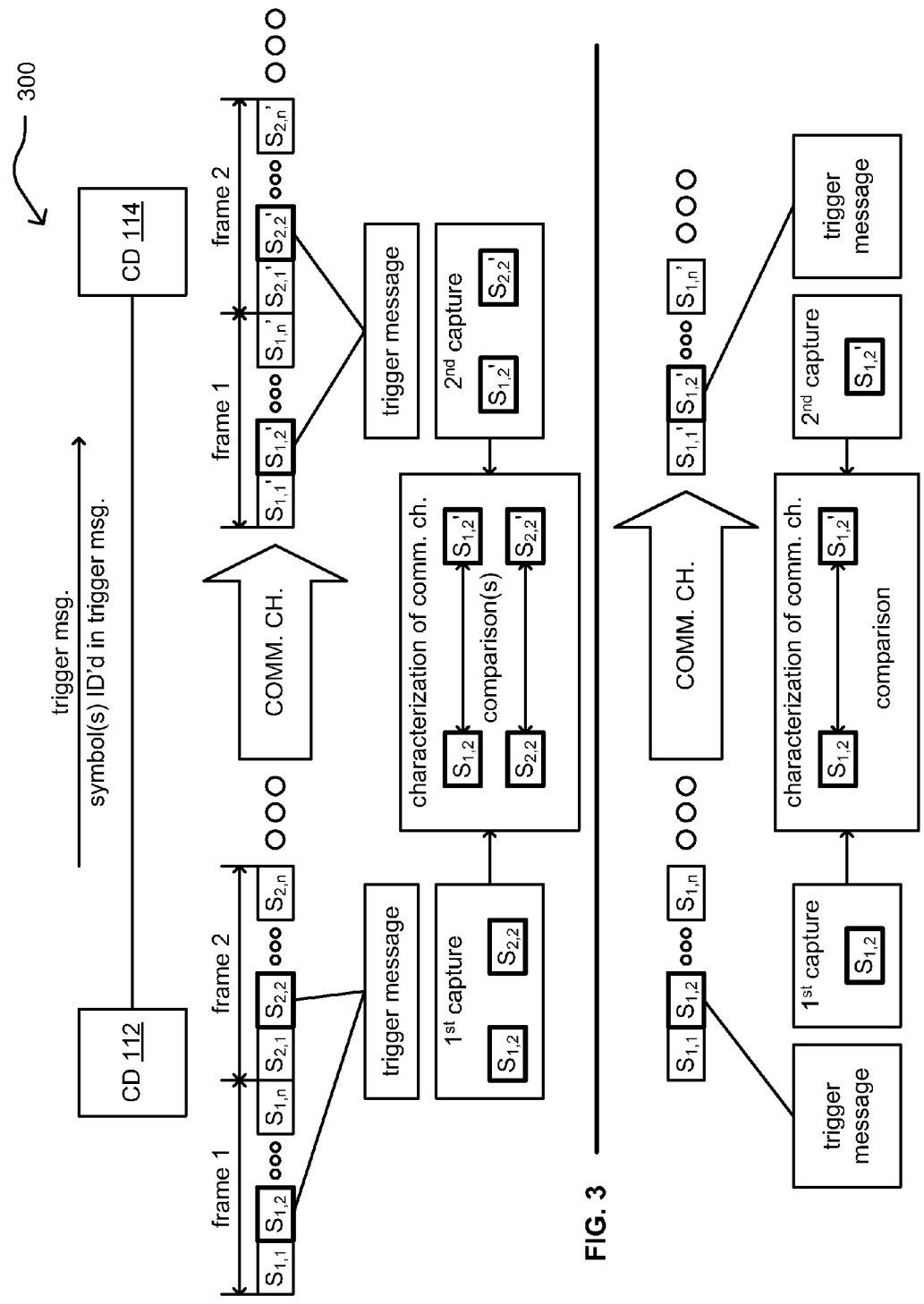
FIG. 3 is a diagram illustrating an example of synchronization of an event at different CDs.

FIG. 3 is a diagram illustrating an example 300 of synchronization of an event at different CDs. In this diagram, device 112 transmits a trigger message to device 114. The trigger message identifies one or more symbols. Note that while many examples herein are described in terms of one or more OFDM symbols being identified within the trigger message, any types of symbols and/or any types of signals may be identified within the trigger message transmitted between devices. Then, the captures based on those symbols and/or signals transmitted between devices subsequent to the transmission of the trigger message (e.g., a first capture performed before transmission and a second capture performed after receipt in a receiver device) allows for a characterization of the communication pathway along which those symbols and/or signals have been transmitted.

In the top portion of this diagram, a trigger message that is transmitted from device 112 to device 114 specifies symbol $S_{1,2}$ in a frame 1 and symbol $S_{2,2}$ in a frame 2. In other examples, only one symbol within one or more frames may be specified by the trigger message. The device 112 performs a first capture of those symbols before or during their transmission to device 114. The device 114 receives the trigger message and then subsequently receives a transmission that includes the one or more symbols identified by the trigger message. The device 114 performs a capture of those symbols identified within the trigger message. When these symbols are affected by one or more channel effects (e.g., noise, interference, distortion, etc.) then the symbols captured by device 114 will be modified, at least somewhat, compared to the symbols before their transmission from device 112. For example, if device 112 generates a trigger message that it identifies $S_{1,2}$ in a frame 1 and symbol $S_{2,2}$, then device 114 will perform capture of symbols at those locations, but they may be slightly modified, as shown by the prime in the diagram (e.g., $S_{1,2}'$ and symbol $S_{2,2}'$ as shown within a second capture performed by device 114).

In the bottom portion of this diagram, a trigger message that is transmitted from device 112 to device 114 specifies symbol $S_{1,2}$ to be transmitted. The device 112 performs a first capture of that specified symbol $S_{1,2}$ before or during its transmission to device 114. The device 114 receives the trigger message and then subsequently receives a transmission that includes the symbol $S_{1,2}$ identified by the trigger message. The device 114 performs a capture of symbol $S_{1,2}$ identified within the trigger message. When symbol $S_{1,2}$ is affected by one or more channel effects (e.g., noise, interference, distortion, etc.) then the symbol $S_{1,2}$ captured by device 114 will be modified, at least somewhat, compared to the symbols before their transmission from device 112. For example, if device 112 generates a trigger message that it identifies $S_{1,2}$, then device 114 will perform capture of the symbol at that location, but they may be slightly modified, as shown by the prime in the diagram (e.g., $S_{1,2}'$ as shown within a second capture performed by device 114). This example of the bottom portion of this diagram shows use of such trigger message functionality without any formal framing structure.

Any device that has access to both the first and second capture can perform characterization of the communication channel between device 112 and device 114. For example, when device 114 receives the first capture from device 112, then device 114 can determine a characterization of the communication channel between devices 112 and 114. In another example, when device 112 receives the second capture from device 114, then device 112 can determine a characterization of the communication channel between devices 112 and 114. In yet another example, another device not shown in the diagram that receives both the first and second captures can perform a characterization of the communication channel between devices 112 and 114.

Generally speaking, any types of symbols and/or signals may be identified within a trigger message and captures based thereon may be used to characterize a communication pathway along which those symbols and/or signals are transmitted. Orthogonal frequency division multiplexing (OFDM) symbols are one possible type of symbols that may be used for these purposes and some details related to OFDM are described below.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or super-frame (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to an OFDM symbol herein includes both OFDM and OFDMA symbols (and general reference to an OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. This example 404 where the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

Generally, a communication device may be configured to include a processor and a communication interface configured to process OFDM or OFDMA symbols and/or frames received from other communication devices and to generate such OFDM or OFDMA symbols and/or frames for transmission to other communication devices. Note that OFDM or OFDMA symbols and/or frames are just one example of types of signals that may be transmitted between communication devices using the various aspects, embodiments, and/or their equivalents, of the various examples and embodiments presented herein.

FIG. 5A is a diagram illustrating an example 501 of test points in various locations within one or more communication systems. As shown in this diagram, different communication devices (e.g., the CMTS and CM) can contain test points that include essential functions of a spectrum analyzer 530, vector signal analyzer (VSA) 540, and network analyzer 510, while the cable plant is considered the Device Under Test (DUT) 520. Note that other test points 550 may be included in other examples.

This example 501 presents a way to characterize, maintain and troubleshoot, in a very rapid and accurate manner, the upstream and downstream cable plant, in order to guarantee the highest throughput and reliability of service. This portion of the disclosure identifies the components, test points, and management capabilities that may be used in accordance with the DOCSIS 3.1 Proactive Network Maintenance system.

Downstream PNM Requirements

This portion of the disclosure defines CMTS and CM requirements for obtaining and buffering symbol samples, providing wideband spectrum analysis, employing excluded subcarriers as a spectral notch, providing equalizer coefficient values, providing quadrature amplitude modulation (QAM) constellation points for display, obtaining and reporting received modulation error ratio (MER) measurements, obtaining and reporting forward error correction statistics, and reporting signal histograms for the downstream channel.

Downstream Symbol Capture

This operation provides partial functionality of a network analyzer to analyze the response of the cable plant. At the CMTS, the modulation values of one full OFDM symbol, before an inverse fast Fourier transform (IFFT) operation, are captured and made available for analysis. This includes the in-phase and quadrature (I and Q) modulation values of all subcarriers, including data subcarriers, pilots, and excluded subcarriers.

This capture will result in the number of samples that depends on the OFDM channel width. Considering some examples, for a 50 kHz sub-carrier spacing in a 192 MHz channel within active bandwidth of 190 MHz, 3800 samples will be captured. For 25 kHz sub-carrier spacing in a 192 MHz channel and an active bandwidth of 190 MHz, 7600 samples will be captured. For a 25 kHz subcarrier spacing in a 24 MHz channel within active bandwidth of 22 MHz, 880 samples will be captured.

At the CM, the received I and Q time-domain samples of one full OFDM symbol before the fast Fourier transform (FFT), not including the guard interval, are captured and made available for analysis. This capture will result in a number of data points equal to the FFT length in use of time online for receiver FFT processing. The number of captured symbols can be reduced for narrower channels of the sampling rate, which is implementation dependent. The capture includes a bit for receiver windowing effects present in the data. Considering some examples, for a 50 kHz sub-carrier spacing in a 192 MHz channel with 204.8 MHz sampling rate, 4096 samples will be captured. For 25 kHz sub-carrier spacing in a 192 MHz channel 204.8 MHz sampling rate, 8192 samples will be captured. For a 50 kHz subcarrier spacing in a 24 MHz channel with a reduced 25.6 MHz sampling rate, 512 samples will be captured.

Generally, considering an example at which a 204.8 MHz FFT sample rate is used and a certain number of samples are captured and made available for analysis, then the index of the starting sample used by the CM receiver for its FFT is also reported. This capture will result in a significant number of data points (e.g., anywhere between approximately 500 and close to 10,000 data points), 16 to 20 bits in width for each of I and Q.

Capturing the input and output of the cable plant is equivalent to a wideband sweep of the channel, which permits full characterization of the linear and nonlinear response of the downstream plant. The MAC provides signaling via the trigger message (e.g., which may be referred to as a physical layer (PHY) Link Channel (PLC) trigger message when transmitted via the physical layer (PHY) Link Channel (PLC)) to ensure that the same symbol is captured at the CMTS and CM (e.g., to ensure that the same symbol or symbols are captured at both ends of the communication pathway).

In this example, the CMTS is capable of capturing the modulation values of one full downstream symbol for analysis, and the CM is capable of locating and capturing the time-domain samples of one full downstream symbol, including guard interval, for analysis. Note that this specific example deals with the communication pathway between a CMTS and a CM. Alternate types of communication pathways and communication devices may operate using similar functionality.

FIG. 5B is a diagram illustrating an example of 502 an OFDM channel with physical layer (PHY) Link Channel (PLC) prior to interleaving. The PHY Link Channel (PLC) relative to the OFDM channel is shown in this diagram. The PHY Link Channel (PLC) is located in the downstream convergence layer. It is used for several tasks.

1. Timestamp
2. Energy management
3. Message channel for bringing new CMs on line.
4. Trigger message for synchronizing an event between the CMTS and CM.

The CMTS assigns a unique PLC to each OFDM channel. If there is more than one OFDM channel, the CM will be directed as to which PLC will be the primary PLC for the CM. When the CM initializes, it first locates a PLC channel. It then acquires just enough configuration information to join a primary downstream profile in the main OFDM channel. From there, it receives further configuration information. Certain preferred RF parameters and CRC-24-D may be employed. Note that this specific example deals with the communication pathway between a CMTS and a CM. Alternate types of communication pathways and communication devices may operate using similar functionality.

FIG. 6A is a diagram illustrating an example 601 of PLC frame structure. In this example 601, the PLC frame includes a preamble of 8 symbols at the beginning of a PLC Frame that consists of a field of fixed pilots. There need not be any separate preamble for the OFDM data channel. The CM searches for the preamble and the adjacent pilots to lock onto the PLC. Even though the PLC frame starts with a preamble, this example 601 may be implemented to use a convention where symbols are numbered starting with the first symbol after the PLC preamble. Symbol number 0 may be used to identify the first symbol after the PLC preamble.

The data portion of the PLC consists of self-contained message blocks (MB). There are four types of message blocks:
1. Timestamp Message Block (TS MB)
2. Energy Management Message Block (EM MB)
3. Message Channel Message Block (MC MB)
4. Trigger Message Block (TR MB)

Each MB has a one one-byte header that consists of a type field followed by configuration bits followed by a data field. The timestamp and energy management message blocks contain a CRC referred to as a CRC-24-D. The CRC for the message channel is contained directly on the packets within the message channel rather than on the message block structure itself.

Note that alternative versions of this example 601 may define additional types of message blocks. For example, a common format for alternative types of message blocks is presented with reference to FIG. 9A and FIG. 9B.

All message blocks are then mapped into a shared set of consecutive forward error correction (FEC) codewords. Thus, the contents of the Timestamp (TS) and Energy Management (EM) message blocks will be slightly delayed by the FEC codeword size and how that FEC codeword is mapped to the underlying symbols.

The PLC frame is a total of 128 symbols in length that includes the 8 symbol preamble. Data capacity and frame duration may be calculated as shown in the Table with reference to FIG. 7A.

FIG. 6B is a diagram illustrating another example 602 of PLC frame structure. In this example 602, note that the locations of the Message Channel Message Block (MC MB) and the Trigger Message Block (TR MB) are interchanged with respect to the example 601.

FIG. 6C is a diagram illustrating another example 603 of PLC frame structure. In this example 603, note that the locations of the Energy Management Message Block (EM MB), the Message Channel Message Block (MC MB), and the Trigger Message Block (TR MB) are interchanged with respect to the examples 601 and 602.

Note that even other alternative example frame formats may be used that include such information as depicted within the examples 601, 602, and 603 but having the information therein arranged in different manners.

FIG. 7A is a diagram illustrating an example 701 of a table describing PLC frame length including preamble. As mentioned above, data capacity and frame duration of transmissions may be calculated as shown in the Table with reference to FIG. 7A.

FIG. 7B is a diagram illustrating an example 702 of a trigger message (alternatively, trigger message block, or TR MB). The trigger MB provides a mechanism for synchronizing an event at the CMTS and CM. For example, the CMTS inserts a TR MB into the PLC and performs an action at a specified time aligned with the PLC frame. When the CM detects the TR MB, it performs an action at a specific time aligned with the PLC frame received at the CM. These operations may be performed using parameters which have been previously configured. The CMTS may perform a related event at a specific related time.

This example 702 of a trigger message block is of type=4, includes certain reserved fields RRRR, and also includes a trigger or transaction identifier (shown as Trigger ID in this diagram)

FIG. 7C is a diagram illustrating another example 703 of a trigger message (alternatively, trigger message block, or TR MB). This example 703 of a trigger message block is of type=4, includes certain reserved fields RRRR, and also includes a transaction ID field, trigger group field, a frame delay field, a symbol select field, followed by a cyclic redundancy check (CRC) field (CRC-24-D).

FIG. 8A is a diagram illustrating an example 801 of a table describing message block (MB) field description. This table describes the various fields included within the example 702 of FIG. 7B of a trigger message. The trigger type field identifies the type of measurement to be performed. For example, the value may be an unsigned integer between from 0 to 15, with the default=1. The Trigger ID is a 2 byte sized (16-bit unique word) trigger identifier. If desired in some example, a perfect match of all 16 bits may be required in order to trigger the prescribed event. A default value may be 0x5ABC.

FIG. 8B is a diagram illustrating an example 802 of a table describing message block (MB) field description. This table describes the various fields included within the example 703 of FIG. 7C of a trigger message.

In this example 802, the Trigger Type field identifies the type of measurement to be performed. Value is unsigned integer from 0 to 15, with default=1. The Transaction Identifier field increments by one on each trigger message that is sent, rolling over at value 255. Value is unsigned integer from 0 to 255.

The Trigger Group field identifies which group of CMs should respond to the trigger message. A CM responds to the trigger message if it has been configured as trigger-enabled and it has membership in the specified Trigger Group. If the CM has not been configured as trigger-enabled, it does not respond to trigger messages.

The Frame Delay field tells the CM how many frames to wait before performing the specified action. Frame Delay=1 (not permitted) would indicate to perform the action in the next PLC frame after the frame containing the TR MB; Frame Delay=2 indicates to perform the action in the second PLC frame after the TR MB; etc. The value is an unsigned integer from 2 to 31, with default=2. Values 0 and 1 are not permitted as they may not give the CM adequate time to prepare for the action. The CMTS specifies a Frame Delay value of 2 or more for a channel with an 8K FFT and 4 or more for a channel with a 4K FFT.

The Symbol Select field tells the CM which symbol in the specified PLC frame to perform the action upon. Symbol Select=0 indicates to perform the action on the OFDM symbol aligned with the first symbol after the PLC preamble which corresponds to the first PLC data symbol; Symbol Select=1 indicates to perform the action on the OFDM symbol aligned with the second symbol after PLC preamble which corresponds to the second PLC data symbol; Symbol Select=120 indicates to perform the action on the OFDM symbol aligned with the one hundred and twenty first symbol after the PLC preamble, and so on. The value is an unsigned integer from 0 to 127. In addition to selecting a symbol, this parameter by convention points to the time instant at the beginning of the selected symbol.

When commanded to do so via a management object, the CMTS inserts a single TR MB into the PLC. The CMTS positions the trigger MB in the PLC frame immediately after the timestamp MB but before any EM MBs, and before the MC MB. The CMTS increments the Transaction ID field in each successive TR MB it sends. The CMTS transmits either 0 or 1 TR MB in a PLC frame.

When trigger-enabled via a management object, the CM detects the TR MB.

In one specific example, for a Downstream Symbol Capture measurement, the following CMTS requirements apply: The CMTS sets Trigger Type=1. The CMTS captures and reports the downstream symbol specified in the TR MB. The CMTS reports the timestamp from the PLC frame pointed to by the trigger message. The CMTS reports the Transaction ID.

In such a specific example, For a Downstream Symbol Capture measurement, the following CM requirements apply: When not in an Energy Management Mode or not operating on battery power, the CM captures and reports the downstream symbol specified in the TR MB if it is trigger-enabled and a member of the Trigger Group specified in the TR MB. The CM reports the Transaction ID.

Note that this specific example of a type of trigger message block described with reference to FIG. 7C in the table of FIG. 8B is one example type of a trigger message block that may be used as described herein. Alternative forms of trigger message blocks may be used in conjunction with and for the various purposes and operations described herein.

Some examples of the application of a trigger message block (TR MB) are described below in the context of interaction between a cable modem (CM) and a cable modem termination system (CMTS).

In a first example, in order for a CM to respond to the TR MB, the CM is pre-configured as follows. The CM is first awakened if it is in sleep mode. The CM is configured to enable triggering. A delay parameter "N" is configured to specify how many PLC frames to wait before performing the triggered action: N=1 indicates to perform the action in the next PLC frame after the frame containing the TR MB; N=2 indicates to perform the action in the second PLC frame after the TR MB; etc. Additional values of the Trigger ID can be defined in the future to specify additional trigger events; these values should be designed using a coding approach so as to maximize their Hamming distance.

At least one application of the TR MB is to enable a Downstream Symbol Capture as describe above. For this case, the following specific information applies. The Trigger Type parameter has value 1. The CM waits the number of PLC frames specified in the configured delay parameter N, then captures the OFDM symbol aligned with a specified PLC preamble symbol. A second configured parameter "M" specifies which PLC preamble symbol to capture: M=1 indicates to capture the OFDM symbol aligned with the first PLC preamble symbol; M=2 indicates to capture the OFDM symbol aligned with the second PLC preamble symbol; etc. The minimum value of the delay parameter for Downstream Symbol Capture is N=2, in order to give the CM time to set up for the capture. The default parameter values are N=2 and M=2. The CMTS will capture the same symbol based on timing in the CMTS transmitter. A group of CMs may be enabled, in which case the CMTS and all enabled CMs will capture the same downstream OFDM symbol.

In a second example, in order for a CM to respond to the TR MB, the CM is first awakened if it is in sleep mode. The CM is configured to enable triggering. The CM is configured to belong to a Trigger Group. The CMTS inserts a single trigger message per measurement including a Trigger Group parameter associated with the group of CMs that are intended to perform the measurement. The message is acted upon only by those CMs which are trigger-enabled and reside in the appropriate Trigger Group; unicast, multicast and broadcast groups are supported.

The initial application of the TR MB can be used to enable a Downstream Symbol Capture measurement. Such a measurement operates to capture the same OFDM symbol at the CMTS and CM. The captured symbol is a normal symbol (not a special test symbol or altered in any way) carrying downstream QAM data traffic. The entire OFDM symbol is captured across all subcarriers, in the form of I and Q samples, at the CMTS and CM. The PLC frame is used only as a timing mechanism to define the location of the desired symbol in the downstream OFDM symbol stream. For Downstream Symbol Capture, the Trigger Type parameter is set to 1.

An operational support system (OSS) management station (e.g., another communication device in the system, which can be the CM, the CMTS, another CM, another CMTS, and/or any other communication device in the system) initiates the measurement via a write to a CMTS management object. The CMTS inserts the TR MB in the PLC of the specified OFDM downstream channel, waits the number of PLC frames defined by the Frame Delay parameter, and captures the OFDM symbol specified by the Symbol Select parameter. This capture will result in a number of frequency-domain data points equal to the FFT length in use (4096 or 8192), 16 bits in width for each of I&Q, with LSBs padded with zeros if required.

A trigger-enabled CM addressed by the Trigger Group parameter detects the presence of the TR MB in the PLC, waits the number of PLC frames defined by the Frame Delay parameter, and captures the OFDM symbol specified by the Symbol Select parameter. This capture will result in a number of time-domain data points equal to the FFT length in use (4096 or 8192), 16 bits in width for each of I&Q, with LSBs padded with zeros if required.

The CMTS captures the 8-byte extended timestamp value present in the PLC frame in which the OFDM symbol was captured, and returns it to the management station along with the captured OFDM symbol samples; this aids in identifying the captured data, and permits comparing the capture time with other timestamped events such as burst noise and FEC errors. The CMTS and CM both return the Transaction ID to the management station along with the captured data; this provides a mechanism for grouping CMTS and CM data from the same symbol for analysis, and for detecting missed captures. If no data was successfully captured by the CMTS and/or a CM, that condition is reported to the management station in lieu of data, along with the Transaction ID if available. The data is stored locally in the CMTS and CM, and returned to the management station based on a command issued by the management station to a management object in the CMTS and CM.

The OSSI specification should limit how many Trigger messages can be sent before the captured data is read out from the CM by the OSS, in order to limit CM memory requirements. The recommended initial default value is a maximum of one capture at a time in a given CM. If a new Trigger message arrives before the previous captured data has been read out, the CM ignores the new trigger and reports that condition via a management object.

This disclosure specifies some possible formats of message block types for the PLC. Other types of Message Blocks may be defined in alternative ways in other examples. In order to make the PLC protocol extensible, Cable Modems (CMs) compliant with this version of specification can be operative to skip and ignore Message Blocks they don't support.

Note that these first and second specific examples of application of a TR MB are described above in the context of interaction between a CM and a CMTS are just some of a number of examples that may operate using a TR MB as described herein and for the various purposes described herein. Alternative applications of such a TR MBs may be used in conjunction with and for the various purposes and operations described herein.

For this purpose a generic format has been defined for Message Block with types 5 through 15. Such a format is presented with reference to FIG. 9A.

FIG. 9A is a diagram illustrating an example 901 of a generic format for message blocks. This generic format includes a Type field, certain reserved fields (R R R), a message body size field, a message body field, and a cyclic redundancy check (CRC) field (CRC-24-D).

FIG. 9B is a diagram illustrating an example 902 of a table describing fields of the generic format for message blocks. In this example 902, the message block type field is four bits and has a value from 5-15. The reserved field (R R R) use may be specific to a message block type and can be made subject to some future definition. The message body size indicates the length of the message body field in octets. The total length of a message block type 5-15 is the message body size plus 5 octets. The message body use is specific to the message block type and can be made subject to some future definition. The CRC field is computed over the entire message block except for the CRC field itself and is included in the defined format to allow validation of the integrity message and message body size.

Figure 10:
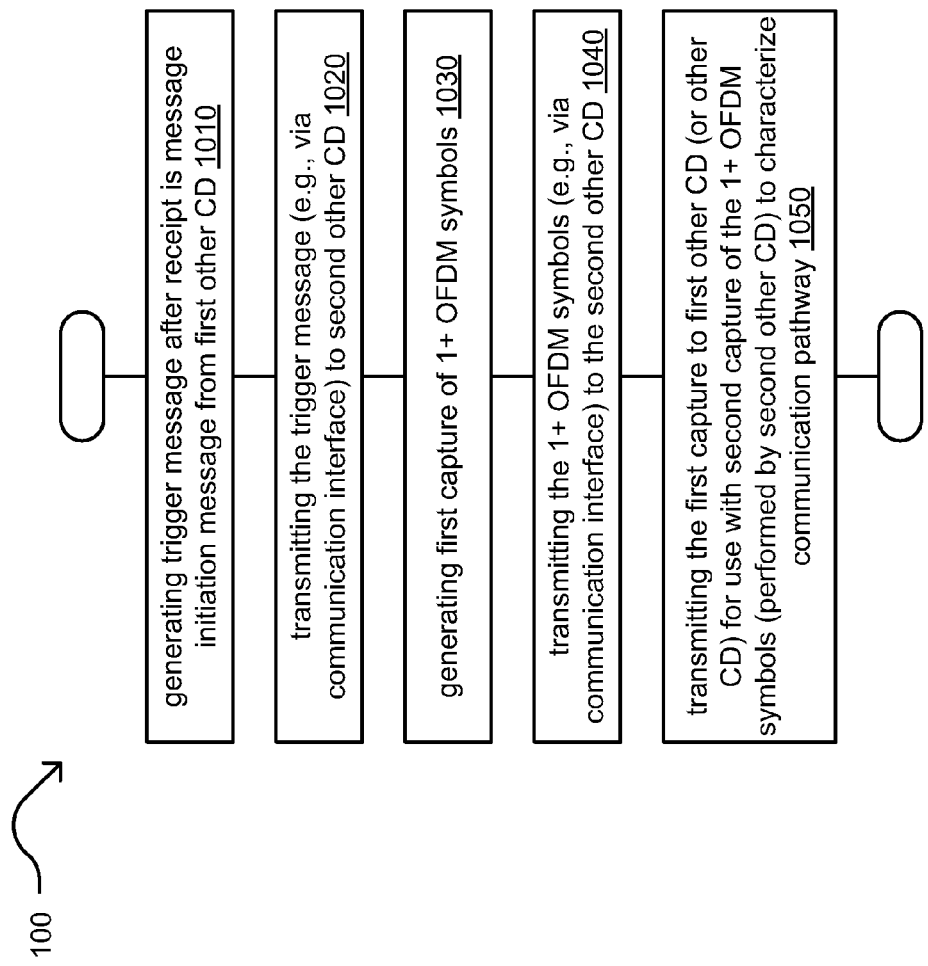
FIG. 10 is a diagram illustrating an embodiment of a method for execution by one or more communication devices.

FIG. 10 is a diagram illustrating an embodiment of a method 1000 for execution by one or more communication devices.

The method 1000 begins by generating a trigger message after a measurement initiation message is received, via a communication interface of the communication device, from a first other communication device (block 1010). The trigger message specifies location of at least one orthogonal frequency division multiplexing (OFDM) data symbol to be transmitted from the communication device to a second other communication device via a communication pathway. In alternate methods, the method 1000 operates by generating the trigger message independently without necessarily receiving a measurement initiation message.

Then, after the trigger message has been generated, the method 1000 continues by transmitting, via a communication interface of the communication device, the trigger message to the second other communication device (block 1020). The method 1000 then operates by generating a first capture that includes a first plurality of OFDM symbol samples of the at least one OFDM data symbol (block 1030). This first capture may be stored in memory for use by the device performing the method 1000. Alternatively, the first capture may be transmitted to another device within a communication system.

The method 1000 then continues by transmitting, via the communication interface, the at least one OFDM data symbol to the second other communication device via the communication pathway (block 1040).

The method 1000 then operates by transmitting, via the communication interface, the first capture to the first other communication device for use to determine a characterization of the communication pathway based on the first capture and based on a second capture that includes a second plurality of OFDM symbol samples of the at least one OFDM symbol as performed by the second other communication device (block 1050). In alternate methods, a device performing the method 1000 determines a characterization of the communication pathway based on the first capture that is stored therein and the second capture that is received from the device that performs the second capture.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
   a communication interface; and
   a processor, the processor and the communication interface configured to:
      generate a trigger message after a measurement initiation message is received from a first other communication device, wherein the trigger message specifies a location of at least one orthogonal frequency division multiplexing (OFDM) data symbol to be transmitted from the communication device to a second other communication device via a communication pathway;
      transmit the trigger message to the second other communication device;
      generate a first capture that includes a first plurality of OFDM symbol samples of the at least one OFDM data symbol;
      transmit the at least one OFDM data symbol to the second other communication device via the communication pathway; and
      transmit the first capture to the first other communication device for use to determine a characterization of the communication pathway based on the first capture and based on a second capture that includes a second plurality of OFDM symbol samples of the at least one OFDM symbol as performed by the second other communication device.

2. The communication device of claim 1, wherein the processor and the communication interface are further configured to:
   generate the trigger message to include a trigger group field that identifies the second other communication device and a third other communication device, wherein the trigger message specifies the location of the at least one OFDM data symbol to be transmitted from the communication device to the second other communication device via the communication pathway and at least one other OFDM data symbol to be transmitted from the communication device to the third other communication device via an other communication pathway;
   transmit the trigger message to the second and third other communication devices;
   transmit the at least one other OFDM data symbol to the third other communication device via the other communication pathway;
   generate a third capture that includes a third plurality of OFDM symbol samples of the at least one other OFDM data symbol; and
   transmit the third capture of the at least one other OFDM data symbol to the third other communication device for use to determine an other characterization of the other communication pathway based on the third capture and based on a fourth capture that includes a fourth plurality of OFDM symbol samples of the at least one other OFDM symbol as performed by the third other communication device.

3. The communication device of claim 1, wherein the processor and the communication interface are further configured to:

generate the trigger message to include a trigger group field that identifies a third other communication device;

receive a response to the trigger message when the third other communication device is trigger-enabled;

transmit the at least one OFDM data symbol to the third other communication device via an other communication pathway when the response to the trigger message is received from the third other communication device; and determine that the third other communication device is not trigger-enabled when no response to the trigger message is received from the third other communication device and terminate trigger message communication with the third other communication device.

4. The communication device of claim 1, wherein the processor and the communication interface are further configured to:

receive, from the second other communication device, the second capture that includes the second plurality of OFDM symbol samples of the at least one OFDM symbol as performed by the second other communication device; and process the first capture and the second capture to determine an other characterization of the communication pathway.

5. The communication device of claim 1, wherein the processor and the communication interface are further configured to:

generate at least one timestamp value capture that includes at least one timestamp value present in the first plurality of OFDM symbol samples of the at least one OFDM data symbol that are captured; and transmit the at least one timestamp value capture to the first other communication device.

6. The communication device of claim 1, wherein the second other communication device is the first other communication device.

7. The communication device of claim 1 further comprising:

a cable headend transmitter or a cable modem termination system (CMTS), and wherein the first other communication device is an operational support system (OSS) communication device, and wherein the second other communication device is a cable modem.

8. The communication device of claim 1 further comprising:

the processor and the communication interface configured to support communications within at least one of a satellite communication system, a wireless communication system, a wired communication system, a fiber-optic communication system, or a mobile communication system.

9. A communication device comprising:

a communication interface; and a processor, the processor and the communication interface configured to:

receive a trigger message from a first other communication device, wherein the trigger message specifies a location of at least one orthogonal frequency division multiplexing (OFDM) data symbol to be received from the first other communication device via a communication pathway;

when the communication device is trigger-enabled and identified within a trigger group field of the trigger message;

receive the at least one OFDM data symbol from the first other communication device via the communication pathway; and generate a first capture that includes a first plurality of OFDM symbol samples of the at least one OFDM data symbol; and transmit the first capture to a second other communication device for use to determine a characterization of the communication pathway based on the first capture and based on a second capture that includes a second plurality of OFDM symbol samples of the at least one OFDM symbol as performed by the first other communication device.

10. The communication device of claim 9, wherein the processor and the communication interface are further configured to:

receive, from the first other communication device, the second capture that includes the second plurality of OFDM symbol samples of the at least one OFDM symbol as performed by the first other communication device; and process the first capture and the second capture to determine an other characterization of the communication pathway.

11. The communication device of claim 9, wherein the second other communication device is the first other communication device.

12. The communication device of claim 9 further comprising:

a cable modem, wherein the first other communication device is a cable headend transmitter or a cable modem termination system (CMTS), and wherein the second other communication device is an operational support system (OSS) communication device.

13. The communication device of claim 9 further comprising:

the processor and the communication interface configured to support communications within at least one of a satellite communication system, a wireless communication system, a wired communication system, a fiber-optic communication system, or a mobile communication system.

14. A method for execution by a communication device, the method comprising:

generating a trigger message after a measurement initiation message is received, via a communication interface of the communication device, from a first other communication device, wherein the trigger message specifies location of at least one orthogonal frequency division multiplexing (OFDM) data symbol to be transmitted from the communication device to a second other communication device via a communication pathway;

transmitting, via the communication interface of the communication device, the trigger message to the second other communication device;

generating a first capture that includes a first plurality of OFDM symbol samples of the at least one OFDM data symbol;

transmitting, via the communication interface, the at least one OFDM data symbol to the second other communication device via the communication pathway; and transmitting, via the communication interface, the first capture to the first other communication device for use to determine a characterization of the communication pathway based on the first capture and based on a second capture that includes a second plurality of OFDM symbol samples of the at least one OFDM symbol as performed by the second other communication device.

15. The method of claim 14 further comprising:

generating the trigger message to include a trigger group field that identifies the second other communication device and a third other communication device, wherein the trigger message specifies the location of the at least one OFDM data symbol to be transmitted from the communication device to the second other communication device via the communication pathway and at least one other OFDM data symbol to be transmitted from the communication device to the third other communication device via an other communication pathway;

transmitting the trigger message to the second and third other communication devices;

transmitting the at least one other OFDM data symbol to the third other communication device via the other communication pathway;

generating a third capture that includes a third plurality of OFDM symbol samples of the at least one other OFDM data symbol; and transmitting the third capture of the at least one other OFDM data symbol to the third other communication device for use to determine an other characterization of the other communication pathway based on the third capture and based on a fourth capture that includes a fourth plurality of OFDM symbol samples of the at least one other OFDM symbol as performed by the third other communication device.

16. The method of claim 14 further comprising:

generating the trigger message to include a trigger group field that identifies a third other communication device;

receiving a response to the trigger message when the third other communication device is trigger-enabled;

transmitting the at least one OFDM data symbol to the third other communication device via an other communication pathway when the response to the trigger message is received from the third other communication device; and determining that the third other communication device is not trigger-enabled when no response to the trigger message is received from the third other communication device and terminating trigger message communication with the third other communication device.

17. The method of claim 14 further comprising:

receiving, from the second other communication device, the second capture that includes the second plurality of OFDM symbol samples of the at least one OFDM symbol as performed by the second other communication device; and processing the first capture and the second capture to determine an other characterization of the communication pathway.

18. The method of claim 14, wherein the second other communication device is the first other communication device.

19. The method of claim 14, wherein the communication device is a cable modem, wherein the first other communication device is a cable headend transmitter or a cable modem termination system (CMTS), and wherein the second other communication device is an operational support system (OSS) communication device.

20. The method of claim 14 further comprising:

operating the communication interface of the communication device to support communications within at least one of a satellite communication system, a wireless communication system, a wired communication system, a fiber-optic communication system, or a mobile communication system.

\* \* \* \* \*